(12) United States Patent
Kim et al.

(10) Patent No.: US 7,898,669 B2
(45) Date of Patent: Mar. 1, 2011

(54) ABSOLUTE DISTANCE MEASUREMENT METHOD AND SYSTEM USING OPTICAL FREQUENCY GENERATOR

(75) Inventors: Seung Woo Kim, Daejon (KR); Jonghan Jin, Daejon (KR); Young Jin Kim, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 0 days.

(21) Appl. No.: 12/289,119

(22) Filed: Oct. 21, 2008

(65) Prior Publication Data

US 2009/0207418 A1 Aug. 20, 2009

(30) Foreign Application Priority Data

Feb. 19, 2008 (KR) ........................ 10-2008-0014984

(51) Int. Cl.
*G01B 9/02* (2006.01)
(52) U.S. Cl. ........................................................ 356/486
(58) Field of Classification Search .......... 356/486–490, 356/498
See application file for complete search history.

(56) References Cited

U.S. PATENT DOCUMENTS 6,646,723 B1 * 11/2003 Dubovitsky et al. ........... 356/4.1

OTHER PUBLICATIONS

Aspen 2007 Asian Symposium for Precision Engineering and Nanotechnology 2007; Nov. 6-9, 2007; pp. Cover, 4 and 39-41, GIST, Gwangju, Korea.
Korean Society for Precision Engineering KSPE 2007 Autumn Conference (and English translation); Nov. 8-10, 2007; Cover, pp. 1-7, 31-36, 39 and 40.
Kim et al., Young-Jin;A wide-range optical frequency generator based on the frequency comb of a femtosecond laser; Jan. 7, 2008; pp. 258-264; vol. 16, No. 1, Optics Express; Optical Society of America.

* cited by examiner

*Primary Examiner* — Hwa S. A Lee
(74) *Attorney, Agent, or Firm* — Bacon & Thomas, PLLC

(57) ABSTRACT

The present invention relates to absolute distance measurement method and system using an optical frequency generator. The absolute distance measurement method using the optical frequency generator includes (a) generating a plurality of different stabilized wavelengths by using the optical frequency generator; (b) obtaining an initial estimation value of a distance to be measured by using a frequency sweeping interferometer; (c) analyzing an uncertainty range of the obtained initial estimation value; (d) measuring excess fraction parts of the different wavelengths by analyzing interference signals for each of the wavelengths; (e) determining integer parts for each of the different wavelengths within the uncertainty range of the initial estimation value; and (f) measuring an absolute distance to be measured by using the excess fraction part and the integer parts for each of the different wavelengths.

5 Claims, 6 Drawing Sheets

ABSOLUTE DISTANCE MEASUREMENT METHOD AND SYSTEM USING OPTICAL FREQUENCY GENERATOR

TECHNICAL FIELD

The present invention relates to absolute distance measurement method and system using an optical frequency generator.

BACKGROUND ART

An absolute distance metrology is a method of measuring a desired distance at once without the motion of a measurement target. Currently, widely used length measuring instruments based on interference principles measure the relative displacement between an initial position and an end position of the measurement target by continuously integrating a phase variation of an interference pattern caused by the motion of the measurement target.

This method is a measurement method to be traceable to a length standard with high measurement uncertainty since an optical frequency comb of a femtosecond pulse laser can be used as a ruler. This method has an advantage in that measurement may be rapidly executed without a complicated calculation process.

However, the measurement target has to be moved as far as you want when measuring a distance due to phase ambiguity. Since the phase variation is continuously integrated, various error components during the measurement are also accumulated.

Hence, a necessity of a measuring instrument capable of measuring an absolute distance while making use of various advantages of a conventional interferometer has been proposed and researches and developments have been also actively carried out.

The absolute distance metrology based on the interference principles includes various methods including a multi-wavelength interferometer which measures the same distance using two or more optical wavelengths, a frequency sweeping interferometer which measures a distance by sweeping an optical frequency in predetermined profile.

Among them, the multi-wavelength interferometer is one of the absolute distance metrological techniques capable of measuring the distance with the high measurement uncertainty and making use of the advantage of an optical interferometer using a short wavelength of the light, but the multi-wavelength interferometer has a demerit in that a distance to be measured should be estimated within a predetermined range, whereby the multi-wavelength interferometer is used only in a specific field such as gauge block calibration in which the distance to be measured may be initially estimated.

The previous absolute distance interferometry could not achieve measurement uncertainty of a level which can be obtained in a relative displacement measurement due to technical problems such as the stability of the wavelengths in use, an algorithm error, and the like.

DETAILED DESCRIPTION OF THE INVENTION

Problem to be Solved by the Invention

The present invention is contrived to solve the above-mentioned problems and an advantage of the present invention is that it provides absolute distance measurement method and system using an optical frequency generator which can measure an absolute distance with maintaining high measurement uncertainty characteristics of an optical interferometer for an existing relative displacement measurement while expanding a measurement range which was limited by the existing stability and accuracy of wavelengths based on the principle of the multi-wavelength interferometer integrally applying the principle of the frequency sweeping interferometer by generating a plurality of wavelengths with high frequency stability and accuracy from the optical frequency generator.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In order to achieve the above-mentioned object, in accordance with an aspect of the present invention, there is provided an absolute distance measurement method using an optical frequency generator including the steps of: (a) generating a plurality of different stabilized wavelengths by using the optical frequency generator; (b) obtaining an initial estimation value of a distance to be measured by using a frequency sweeping interferometer; (c) analyzing an uncertainty range of the obtained initial estimation value; (d) measuring excess fraction parts of the different wavelengths by analyzing interference signals for each of the wavelengths; (e) determining integer parts for each of the different wavelengths within the uncertainty range of the initial estimation value; and (f) measuring an absolute distance to be measured by using the excess fraction parts and the integer parts for each of the different wavelengths.

The step (a) includes the steps of: (a1) generating a beat frequency between a single-wavelength laser generated from an external cavity laser diode (ECLD) and the optical comb of a femtosecond laser; (a2) generating an electrical control signal for synchronizing the beat frequency with a predetermined reference frequency from a phase locked loop (PLL) to transmit the generated electrical control signal to the external cavity laser diode; and (a3) generating stabilized wavelengths according to the electrical control signal transmitted from the phase locked loop (PLL) in the external cavity laser diode.

The step (a) includes the steps of: (a1) extracting a single frequency mode from the optical comb of a femtosecond laser; (a2) applying the extracted single frequency mode to a laser diode; and (a3) generating a stabilized frequency by amplifying the light applied to the laser diode.

In order to achieve the object mentioned above, in accordance with another aspect of the invention, an absolute distance measurement system using an optical frequency generator includes: an optical frequency generating module for generating a plurality of different stabilized wavelengths and sweeping frequency continuously from a first wavelength $\lambda_1$ to a second wavelength $\lambda_2$ among the plurality of different wavelengths; and an interferometer module for measuring each of excess fraction parts for the different wavelengths emitted from the optical frequency generating module and measuring a phase difference $\Delta\phi$ between two wavelengths by sweeping frequency continuously from the first wavelength $\lambda_1$ to the second wavelength $\lambda_2$.

The optical frequency generating module includes: an external cavity laser diode (ECLD) for generating a single-frequency stabilized laser; a femtosecond laser for a frequency ruler; an avalanche photo diode for measuring a beat frequency generated between the single-wavelength laser generated from the external cavity laser diode (ECLD) and the optical comb of a femtosecond laser; and a phase locked loop unit for generating an electrical control signal for synchronizing the beat frequency measured from the avalanche photo diode with a predetermined reference frequency to output the generated electrical control signal to the external cavity laser diode, wherein the external cavity laser diode generates a stabilized frequency according to the electrical control signal outputted from the phase locked loop unit to emit the generated wavelength to the interferometer module.

The optical frequency generating module includes: a femtosecond laser for a frequency ruler; an optical frequency extracting unit for extracting a single frequency mode from the optical comb of a femtosecond laser; and an optical frequency amplifying unit for generating a wavelength of a extracted frequency by amplifying a single frequency mode extracted from the optical frequency extracting unit to emit the generated stabilized frequency wavelength to the interferometer module.

ADVANTAGEOUS EFFECTS

In accordance with the present invention, the absolute distance can be measured and the refractive index of the air can be compensated by generating several wavelengths using the optical frequency generator capable of arbitrarily obtaining a desired wavelength with the traceability to a frequency standard, whereby the present invention can be applied to a precision length measurement and can be utilized in various fields such as spectroscopy requiring the stable frequency, biotechnology, tomography, thickness measurement, standard calibration, and the like.

A widely used relative displacement interferometry and an absolute distance interferometry can be applied, whereby the present invention may be widely used for works including the positioning of a large-size ultraprecison apparatuses such as a semiconductor apparatus and an LCD apparatus, the assembly and positioning of an airplane, a space-craft, and a ship building, the huge construction such as a large-sized bridge, and the positioning of satellites fleet.

BEST MODE FOR CARRYING OUT THE INVENTION

Hereinafter, preferred embodiments of the present invention will be described in detail with reference to the accompanying drawings. Prior to this, terms and words used in the specification and appended claims should not be defined as general or dictionary meanings and should be analyzed as the meaning and should be defined by meanings and concepts without departing from the principles and spirit of the general inventive concept, the scope of which is defined append claims and their equivalents so that the inventor describes his own invention in best modes. Accordingly, since the embodiments described in the specification and the configuration shown in the accompanying drawings are just preferred embodiments of the invention and the above embodiments are not limitative, it should be understood that various modifications and changes may be made at this application point of time.

Figure 1:
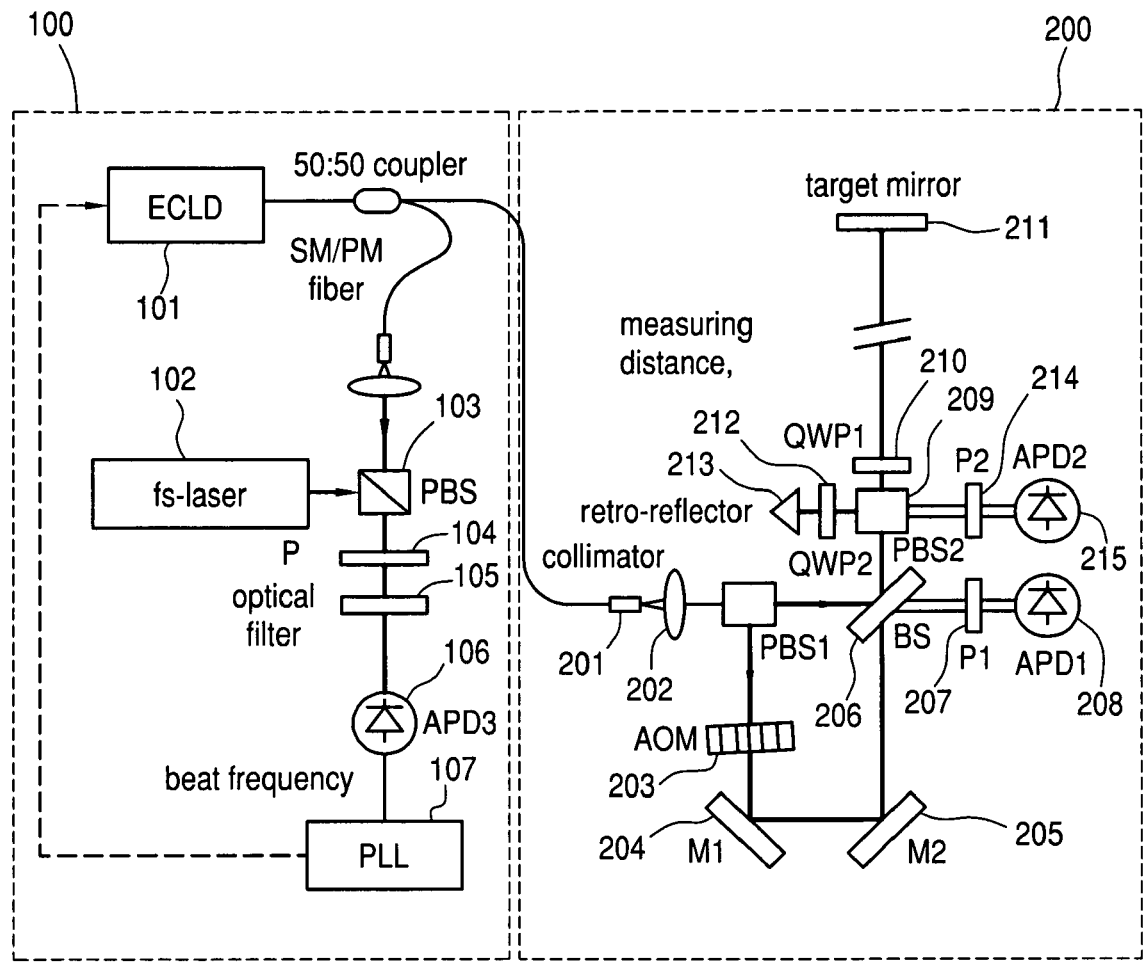
FIG. 1 is a diagram showing an optical configuration of an interferometer for measuring an absolute distance based on an optical frequency generator in accordance with an embodiment of the present invention.
Figure 2:
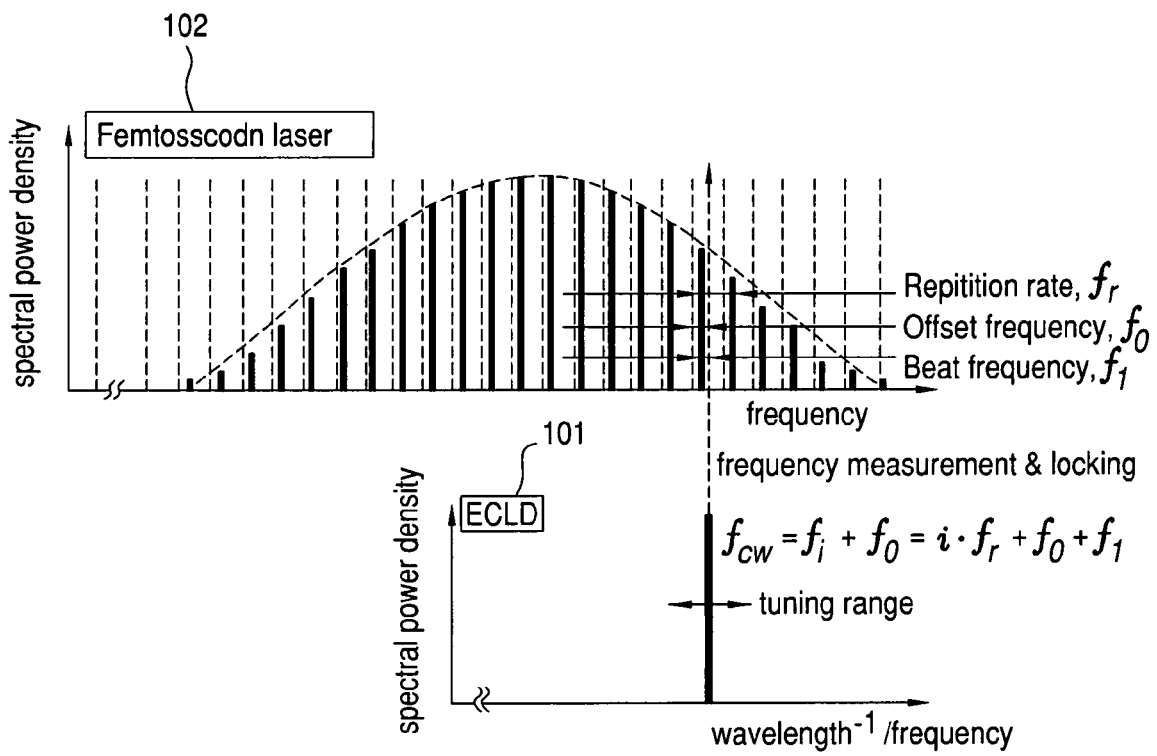
FIG. 2 is a diagram showing an example of generating stabilized optical frequencies from an optical frequency generating module.

FIG. 1 is a diagram showing an optical configuration of an interferometer for measuring an absolute distance using an optical frequency generator in accordance with an embodiment of the present invention; and FIG. 2 is a diagram showing an example of generating stabilized optical frequencies in an optical frequency generating module.

As shown in FIG. 1, an absolute distance measurement system using an optical frequency generator in accordance with the present invention generally includes an optical frequency generating module 100 and an interferometer module 200.

The optical frequency generating module 100 based on an external wavelength tunable light source includes an external cavity laser diode (ECLD) 101, a femtosecond laser 102, a polarization beam splitter (PBS) 103, a polarizer (P) 104, an optical filter 105, an avalanche photo diode (APD3) 106, and a phase locked loop (PLL) 107.

The external cavity laser diode (ECLD) 101 generates a monochromatic light with the tunable range of 765 to 781 nm in wavelength.

Further, the external cavity laser diode (ECLD) 101 generates a stabilized frequency wavelength according an electrical control signal transmitted from the phase locked loop (PLL) 107 to emit the generated frequency to the interferometer module 200.

The femtosecond laser (fs-laser) 102 generates a pulse train with a lot of frequency modes.

A polarizing beam splitter (PBS) 103 transmits or reflects the light incident from the external cavity laser diode (ECLD) 101 and the femtosecond laser (fs-laser) 102 according to a polarizing direction. At this time, a beat frequency is generated between the external cavity laser diode (ECLD) 101 and the femtosecond laser (fs-laser) 102.

The polarizer (P) 104 extracts a linearly polarized light from the laser reflected and transmitted in the polarizing beam splitter (PBS) 103 so as to verify the interference occurring in the polarizing beam splitter (PBS) 103.

The optical filter 105 selectively allows the linearly polarized light inputted by being extracted from the polarizer (P) 104 to transmit in the transmission bandwidth.

The avalanche photo diode (APD3) 106 measures the beat frequency generated by the optical comb of the femtosecond laser (fs-laser) 102 and the external cavity laser diode (ECLD) 101 with the aid of the optical filter 105.

The phase locked loop (PLL) 107 outputs an electrical control signal for synchronizing the beat frequency obtained from the avalanche photo diode (APD3) 106 with a predetermined reference frequency to stabilize the external cavity laser diode (ECLD) 101.

That is to say, a frequency $f_{cw}$ of a light emitted from the external cavity laser diode (ECLD) is found by measuring the beat frequency generated by the optical comb of the femtosecond laser (fs-laser) 102 and the external cavity laser diode (ECLD) 101 after the polarizing beam splitter (PBS) 103. This will be described in more detail with reference to FIG. 2.

As shown in FIG. 2, when the optical comb of the femtosecond laser (fs-laser) 102 and the single-wavelength laser emitted from the external cavity laser diode (ECLD) 101 interfere with each other, and thus the beat frequency can be measured.

An i-th frequency mode in a frequency mode comb of a stabilized femtosecond laser emitted from the femtosecond laser (fs-laser) 102 may be expressed in Equation 1 below and the frequency $f_{cw}$ of the light emitted from the external cavity laser diode (ECLD) can be found by Equation 2.

$$f_i = i \cdot f_r + f_o \qquad \text{Equation 1}$$

where,
$f_i$: i-th frequency mode
i: integral number
$f_r$: repetition rate
$f_o$: carrier-envelope offset frequency $$f_{cw} = f_i + f_b = i \cdot f_y + f_o + f_b \qquad \text{Equation 2}$$

$f_{cw}$: frequency of light emitted from external cavity laser diode (ECLD)
$f_b$: beat frequency The frequency $f_{cw}$ of the light emitted from the external cavity laser diode (ECLD) can be found by adding the beat frequency $f_b$ to the i-th frequency mode $f_i$.

At this time, when the frequency $f_{cw}$ of the light emitted from the external cavity laser diode (ECLD) is an instable frequency within a tuning frequency range. When an electrical control signal for synchronizing the beat frequency $f_b$ with a predetermined reference frequency in the phase locked loop (PLL) 107 is transmitted to the external cavity laser diode (ECLD) 101, a light having a stabilized frequency $f_{cw}$ is emitted from the external cavity laser diode (ECLD) at this point of time.

The interferometer module 200 includes a collimatior 201, a first polarizing beam splitter (PBS1) 202, an acousto-optic modulator (AOM) 203, a first mirror (M1) 204, a second mirror (M2) 205, a beam splitter (BS) 206, a first polarizer 207, a first avalanche photo diode (APD1) 208, a second polarizing beam splitter (PBS2) 209, a first quarter wave plate (QWP1) 210, a target mirror 211, a second quarter-wave plate (QWP2) 212, a retro reflector 213, a second polarizer 214, and a second avalanche photo diode (APD2) 215.

The collimatior 201 collimates a light with high stability which is emitted from the external cavity laser diode (ECLD) 101 of the optical frequency generating module 100 and transmitted through an optical fiber.

The first polarizing beam splitter (PBS1) 202 splits the light collimated in the collimatior 201 into a light transmitted and a light reflected according to polarization.

The acousto-optic modulator (AOM) 203 shifts the frequency of the reflected light in the first polarizing beam splitter (PBS1) 202 by a modulation frequency $f_b$ of a radio frequency band.

The first mirror (M1) 204 reflects the light frequency-shifted by the modulation frequency $f_b$ of the radio frequency band of the acousto-optic modulator (AOM) 203.

The second mirror (M2) 205 reflects the light coming from first mirror 204 and emits the reflected light to the beam splitter (BS) 206.

When the transmitted light from the first polarizing beam splitter (PBS1) 202 and the reflected light in the second mirror 205 are incident in the beam splitter (BS) 206, the beam splitter (BS) 206 splits the mixed light and outputs the split light in two directions.

The first polarizer (P1) 207 emits the light mixed in the beam splitter (BS) 206 to the first avalanche photo diode (APD1) 208.

The first avalanche photo diode (APD1) 208 can detect the interference signal from the first polarizer (P1) 207 having a modulation frequency component of the acousto-optic modulator (AOM) 203.

The second polarizing beam splitter (PBS2) 209 splits a light transmitted from the beam splitter (BS) 206 according to the polarization, and reflects the light to the retro-reflector 213 and transmits the light to the target mirror 211.

Herein, as the collimated light is split into the reflected light and the light in the first polarizing beam splitter (PBS1) 202, the reflected light emitted to the retro-reflector 213 is the light frequency-shifted by the modulation frequency $f_b$ of the radio frequency band of the acousto-optic modulator (AOM) 203 and the transmitted light propagated to the target mirror 211 is a light having an original frequency.

The second polarizing beam splitter (PBS2) 209 receives the light reflected from both the target mirror 211 through the first quarter-wave plate (QWP1) 210 and the light reflected from the retro-reflector 213 through the second quarter-wave plate (QWP2) 212.

The first quarter-wave plate (QWP1) 210 emits the transmitted light incident from the second polarizing beam splitter (PBS2) 209 to the target mirror 211 and rotates the polarization direction reflected from the target mirror 211 at 90 degrees to emit the rotated light to the second polarizing beam splitter (PBS2) 209.

The target mirror 211 reflects the transmitted light incident through the first quarter-wave plate (QWP1) 210 to emit the reflected light to the first quarter-wave plate (QWP1) 210.

The second quarter-wave plate (QWP2) 212 emits the reflected light incident from the second polarizing beam splitter (PBS2) 209 to the retro-reflector 213 and rotates the polarization direction reflected from the retro-reflector 213 at 90 degrees to emit the light to the second polarizing beam splitter (PBS2) 209.

The retro-reflector 213 reflects the light from the second quarter-wave plate (QWP2) 212 to the second quarter-wave plate (QWP2) 212.

The second polarizer 214 receives the transmitted light and the reflected light emitted from the second polarizing beam splitter (PBS2) 209 to mix the polarization direction, and then the light goes to the second avalanche photo diode (APD2) 215.

The second avalanche photo diode (APD2) 215 receives the interference signal between the transmitted light and the reflected light emitted from the second polarizer 214.

In the end, a decimal fraction for a stabilized wavelength emitted from the external cavity laser diode (ECLD) can be obtained by measuring a phase difference between the interference signal detected in the first avalanche photo diode (APD1) 208 and the interference signal detected in the second avalanche photo diode (APD2) 215 with a phase measuring instrument.

Figure 3:
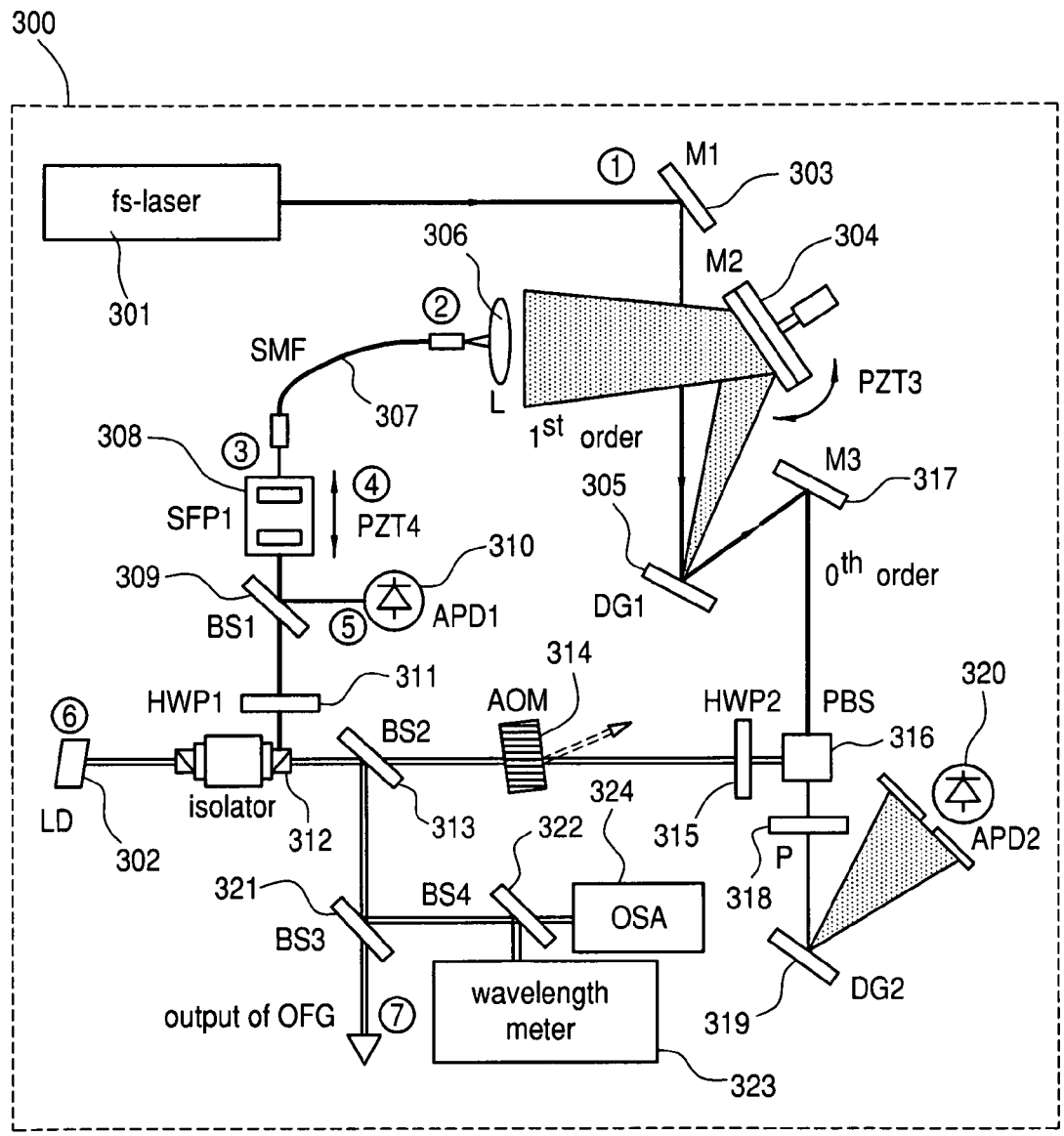
FIG. 3 is a diagram showing an optical configuration of an optical frequency generating module in accordance with another embodiment of the present invention.
Figure 4:
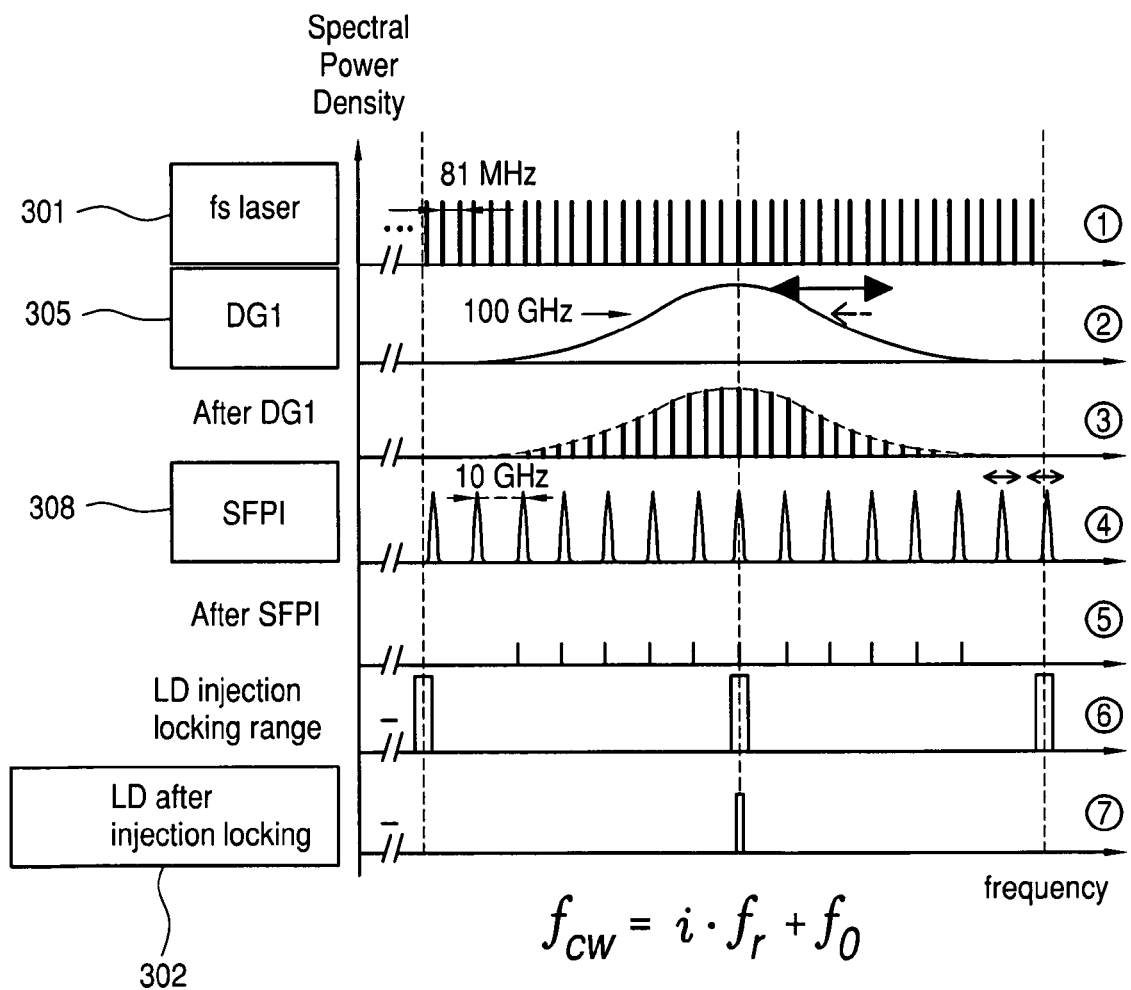
FIG. 4 is a diagram showing an example of generating a stabilized optical frequency in the optical frequency generating module of FIG. 3.

FIG. 3 is a diagram showing an optical configuration of an optical frequency generating module in accordance with another embodiment of the present invention, and FIG. 4 is a diagram showing an example of generating a stabilized optical frequency in the optical frequency generating module of FIG. 3.

As shown in FIG. 3, an optical frequency extraction based optical frequency generating module 300 includes a femtosecond laser 301, a laser diode (LD) 302, a first mirror (M1) 303, a second mirror (M2) 304, a first diffraction grating (DG1) 305, a lens (L) 306, a single mode fiber (SMF) 307, a scanning Fabry-Perot interferometer (SFPI) 308, a first beam splitter (BS1) 309, a first avalanche photo diode (APD1) 310, a first half wave plate (HWP1) 311, an optical isolator 312, a second beam splitter (BS2) 313, an acousto-optic modulator (AOM) 314, a second half wave plate (HWP2) 315, a polarizing beam splitter (PBS) 316, a third mirror (M3) 317, a polarizer (P) 318, a second diffraction grating (DG2) 319, a second avalanche photo diode (APD2) 320, a third beam splitter (BS3) 321, a fourth beam splitter (BS4) 322, a wavelength meter 323, and an optical spectrum analyzer (OSA) 324.

The femtosecond laser (fs-laser) 301 generates a pulse train having various frequency modes.

The laser diode (LD) 302 generates a single-wavelength light if it is independently used but if the light having a frequency within an injection locking range is applied from the outside, the laser diode (LD) 302 amplifies and outputs the applied light.

The first mirror (M1) 303 reflects the light of the femtosecond laser (fs-laser) 301 and reflect the light to the first diffraction grating (DG1) 305.

The first diffraction grating (DG1) 305 diffracts the light having the various frequency modes of the femtosecond laser (fs-laser) 301 to the diffraction light at different angles according to the wavelength.

At this time, the un-diffracted light goes to the third mirror (M3) 317.

The second mirror (M2) 304 reflects the diffracted light from the first diffraction grating (DG1) 305 to reflect the light to the lens (L) 306.

The second mirror (M2) 304 can extract a light for selected bandwidth from the optical comb, and the lens (L) 306 allows the extracted light to be incident in the single mode optical fiber (SMF) 307.

The single mode optical fiber (SMF) 307 delivers the light to the scanning Fabry-Perot interferometer (SFPI) 308.

The scanning Fabry-Perot interferometer (SFPI) 308 selects only a desired frequency mode in the transmitted light from the single mode optical fiber (SMF) 307. At this time, the intensity of the extracted frequency mode remains weak.

The first beam splitter (BS1) 309 splits the light from the scanning Fabry-Perot interferometer (SFP1) to emit the light to the first avalanche photo diode (APD1) 310 and the first half-wave plate (311).

The first avalanche photo diode (APD1) 310 measures the intensity of the light passing through the scanning Fabry-Perot interferometer (SFPI) 308. The detected light at the first avalanche photo diode (APD1) 310 is used as a control signal of the Fabry-Perot interferometer (SFPI) 308 for passing one desired frequency mode.

A polarizing direction can be adjusted so that a light penetrating the first beam splitter (BS1) 309 is transmitted to the laser diode (LD) 302 by passing the first half-wave plate (HWP1) 311 and being reflected in the optical isolator 312.

The optical isolator 312 allows a light outputted in the laser diode (LD2) 302 to go to the second beam splitter (BS2) 313 and disables the light to return to the laser diode (LD) 302 from the second beam splitter (BS2) 313. A light incident from the first half-wave plate 311 is reflected in the optical isolator 312 and transmitted to the laser diode (LD) 302.

That is to say, the optical isolator 312 applies a light of only a desired frequency mode to the laser diode (LD) 302 from the femtosecond laser (fs-laser) 301 to amplify the selected mode and allows the light amplified in the laser diode (LD) 302 to pass in the direction of the second beam splitter (BS2) 313 to be used for the distance measurement interferometer.

The laser diode (LD) 302 completely suppresses amounts of undesired frequency modes remaining the scanning Fabry-Perot interferometer (SFPI) 308 while amplifying an intensity of the light of the extracted frequency mode.

The second beam splitter (BS2) 313 splits the light from the laser diode (LD) 302 to both directions of the acousto-optical modulator (AOM) 314 and the third beam splitter (BS3) 321.

The acousto optical modulator (AOM) 314 frequency-shifts an amplified frequency mode so as to measure and evaluate the stability and accuracy of the extracted frequency from the femtosecond laser 301. The frequency shifted light goes to the second half-wave plate (HWP2) 315.

The second half-wave plate (HWP2) 315 adjusts the intensity of an extracted light with aid of the (PBS) 316 and the polarizer (P) 318 mixes the polarization components of the light from the acousto-optic modulator (AOM) 314 and the third mirror (M3).

At this time, the light from the second half-wave plate (HWP2) 315 has a shifted frequency caused by modulation frequency of the acousto-optic modulator (AOM) 314 $f_{AOM}$ and interferes with the optical comb of a femtosecond laser, therefore, the modulation frequency $f_{AOM}$ can be observed.

The stability of the extracted frequency mode is evaluated by measuring the beat frequency between the between the light from the second half-wave plate (HWP2) 315 and original optical comb of the femtosecond laser through the second avalanche photo diode (APD2) 320.

The polarizer (P) 318 extracts a linear polarization component of the light from the polarizing beam splitter (PBS) 316.

The light detected in the second avalanche photo diode (APD2) 320 is applied to a radio frequency spectrum analyzer or a frequency counter and is used to verify a line width, stability, accuracy, and side mode suppression ratio (SMSR). Further, the light is used to determine the maintenance of a stable control and control a temperature and a current value of the laser diode (LD) 302.

The third polarizing splitter (BS3) 321 splits the light from the second beam splitter (BS2) 313 to both direction of the interferometer module 200 and the fourth beam splitter (BS4) 322.

The fourth beam splitter (BS4) 322 splits the light from the third beam splitter (BS3) 321 to both directions of the wavelength meter 323 and the optical spectrum analyzer (OSA) 324.

The accuracy and stability of the optical frequency of the light from the fourth splitter (BS4) 322 can be evaluated and verified through the wavelength meter 323.

The optical spectrum analyzer (OSA) 324 can evaluate and verify the line width, accuracy, stability, and side mode suppression ratio (SMSR) of the light from the fourth splitter (BS4) 322.

That is to say, optical frequency generator based on one mode extraction can extract only a desired mode through the scanning Fabry-Perot interferometer (SFPI) 308 and selectively amplifies the light using the laser diode (LD) 302. An optical frequency of the emitted corresponds to an optical frequency of the frequency mode extracted from the optical comb. This will be described in more detail with reference to FIG. 4.

As shown in FIG. 4, a light emitted from the femtosecond laser (fa-laser) 301 has various frequency modes with equal spacing. Only a partial wavelength selectively survives while passing the first diffraction grating (DG1) 305 and only one desired frequency mode survives while passing the scanning Fabry-Perot interferometer (SFPI) 308. At this time, a part of the intensity of light of undesired frequency modes survives, and the part of the intensity of light is applied to the laser diode (LD) 302 and amplified based on the injection locking technique. Optical amplification of a high level of 50 dB or higher can be performed by applying the extracted frequency mode to the laser diode (LD) 302.

An i-th frequency mode in an optical comb emitted from the femtosecond laser (fs-laser) 301 may be expressed in Equation 1 described above. When the optical frequency mode to be selectively extracted is the i-th mode, the optical frequency after the amplification may be also expressed in the Equation 1 exactly.

At this time, when the frequency mode of the femtosecond laser (fs-laser) 301 is not applied, a frequency of a light from the corresponding laser diode (LD) 302 is an instable frequency within a variable frequency range, while when the frequency mode of the femtosecond laser (fs-laser) 301 is stably applied to the laser diode (LD) 302, the frequency of the light emitted from the laser diode (LD) 302 has a stabilized frequency as described in the Equation 1 from this point of time.

The amplified light emitted from the laser diode (LD) 302 is incident in the interferometer module 200 shown in FIG. 1, thereby determining an excess fraction part for the stabilized frequency wavelength emitted from the laser diode (LD) 302.

A frequency between the frequency modes may be generated by adjusting a repetition rate $f_r$ of the Equation 1 with varying a cavity length of the femtosecond laser. At the same time, it is possible to obtain the same effect even by using the acousto-optic modulator (AOM) serving as an optical device capable of shifting the frequency at the output.

Hereinafter, the absolute distance measurement method using the multi-wavelength interferometer and the frequency sweeping interferometer will be described with reference to FIGS. 5 and 6. Prior to this, principles of the multi-wavelength interferometer and the frequency sweeping interferometer will be described in brief.

The multi-wavelength interferometer (MWI) overcomes the phase ambiguity problem by using two or more well defined and stabilized wavelengths. Equation 3 shows a case that an absolute distance (L) is measured with different N wavelengths by using the principle of the multi-wavelength interferometer.

$$L = \frac{\lambda_1}{2}(m_1 + \varepsilon_1) = \frac{\lambda_2}{2}(m_2 + \varepsilon_2) = \ldots = \frac{\lambda_N}{2}(m_N + \varepsilon_N) \quad \text{Equation 3}$$

where,
$\lambda_i$: i (i=1, 2, ..., N)-th wavelength
$m_i$: integer part for i-th wavelength ($\lambda_i$)
$\varepsilon_i$: excess fraction part for i-th wavelength ($\lambda_i$)

At this time, the excess fraction part $\varepsilon_i$ can be directly measured by analyzing the interference signal, while the integer part $m_i$ cannot be directly obtained due to the phase ambiguity.

In the Equation 3, number of the unknowns of the integer parts ($m_i$, I=1, 2, ..., N) and absolute distance (L) is N+1. Since the number of the unknowns is more than the number of equations by one, a unique solution cannot be obtained, but in the case of the absolute distance L to be initially estimated within a very small range, the absolute distance L can be analytically obtained through an exact fraction method.

By obtaining an initial estimation value of an absolute distance to be measured the absolute distance L can be determined. The absolute distance L can be determined when a difference between the excess fraction part $\varepsilon_i$ measured in each wavelength and a theoretical excess fraction part is smaller than a tolerance d. This is expressed in Equation 4.

$$\left|E\left(\frac{L_c}{\lambda_i}\right) - \varepsilon_i\right| < d \quad (i = 1, 2, 3, \ldots) \quad \text{Equation 4}$$

where,
E(X): function using excess fraction part of X

At this time, this method is a method of finding a conformed solution within a predetermined range and thus since several solutions may satisfy the condition at the same time, the initial estimation should be performed well so as to obtain a unique solution. An offset between solutions which can be obtained through the exact fraction method is determined according to a wavelength used for the measurement and a tolerance of the excess fraction part.

When the optical frequency generator which can accurately generate a desired optical frequency is introduced into the multi-wavelength interferometer, wavelengths for keeping the offset between the solutions to the maximum can be properly selected and generated, thereby extending a measurement area of the multi-wavelength interferometer.

Since the wavelength can be continuously swept with high accuracy, the initial estimation value of the measurement distance can be obtained well to measure the absolute distance by using the principle of the frequency sweeping interferometer.

The frequency sweeping interferometer can measure the absolute distance without the phase ambiguity problem by counting the number of an interference pattern while continuously scanning the wavelength in predetermined wavelengths $\lambda_1$ i to $\lambda_2$. A distance L between a reference and a measurement target of the interferometer can be expressed in Equation 5 by using a phase difference $\Delta\phi$ obtained at the time of performing the wavelength sweeping.

$$L = \frac{\lambda_S}{2} \frac{\Delta\phi}{2\pi} = \frac{\lambda_S}{2}(\Delta N + \Delta\varepsilon) \quad \text{Equation 5}$$

$\lambda_S$: wavelength of synthetic wave
$\Delta\phi$: phase difference
$\Delta N$: integer part
$\Delta\varepsilon$: excess fraction part Herein, the integer part $\Delta N$ of the phase difference $\Delta\phi$ can be obtained by counting the number of the interference pattern during wavelength sweeping and the excess fraction part $\Delta\varepsilon$ can be obtained through a difference $\varepsilon_2 - \varepsilon_1$ between the excess fraction parts $\varepsilon_2$ and $\varepsilon_1$ analyzing the interference pattern in an initial wavelength and an end wavelength. At this time, the synthetic wavelength $\lambda_S$ is determined by the initial wavelength $\lambda_1$, and the end wavelength $\lambda_2$ and can be expressed in Equation 6.

$$\lambda_S = \frac{\lambda_1 \lambda_2}{\lambda_1 - \lambda_2} \quad \text{Equation 6}$$

Figure 5:
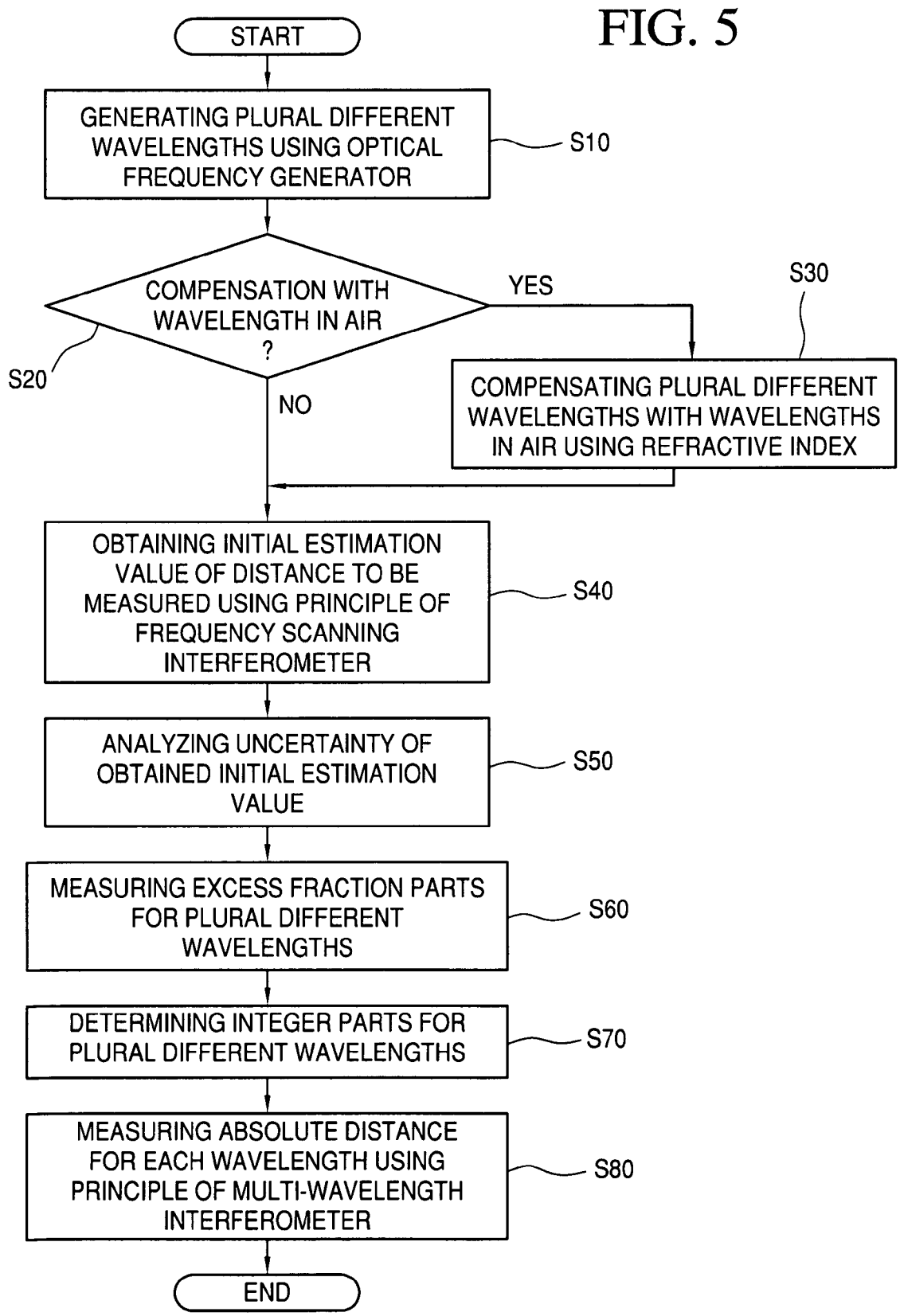
FIG. 5 is a diagram showing an absolute distance metrology using the optical frequency generator in accordance with the present invention.
Figure 6:
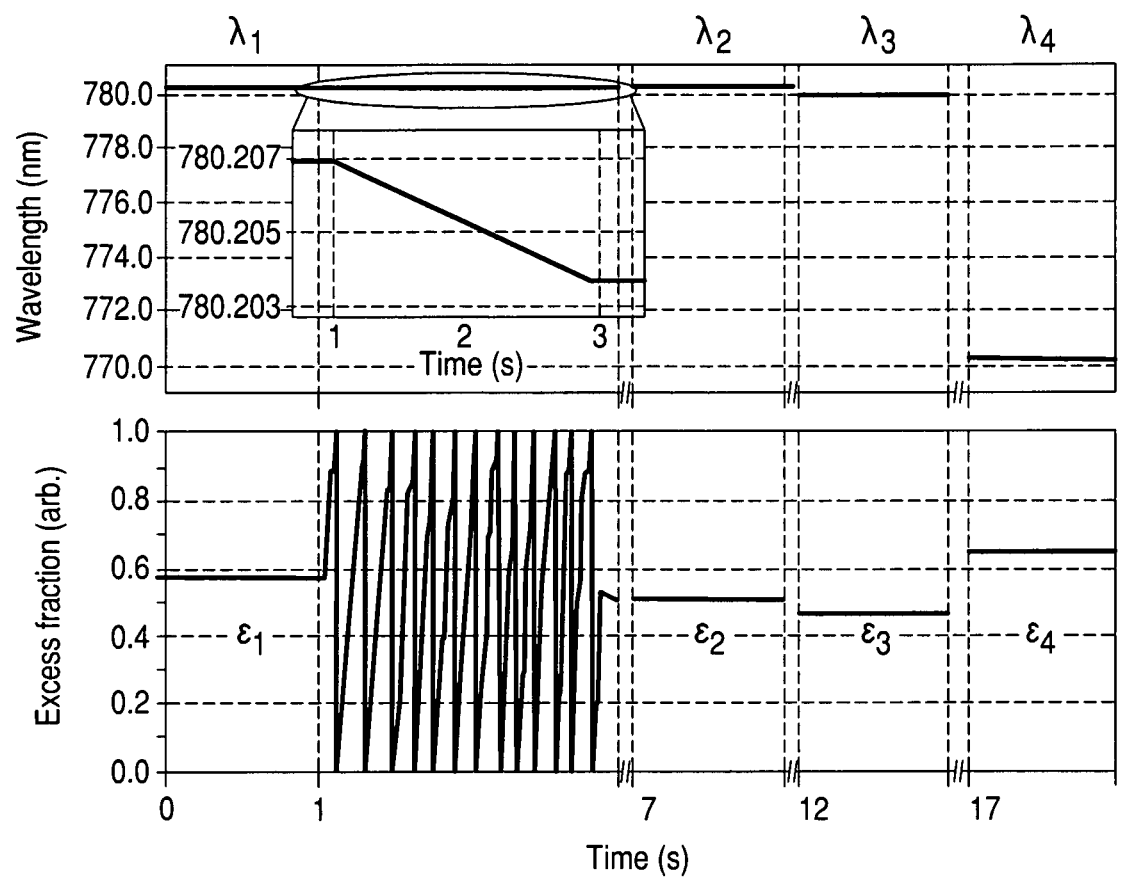
FIG. 6 is a diagram showing an example of wavelength modulation for absolute distance measurement.

FIG. 5 is a diagram showing the absolute distance measurement method using the optical frequency generator in accordance with the present invention; and FIG. 6 is a diagram showing an example of wavelength modulation for absolute distance measurement.

As shown in FIG. 5, four different stabilized wavelengths 780.2070 nm ($\lambda_1$), 780.2037 nm ($\lambda_2$), 779.9535 nm ($\lambda_3$), and 770.2043 nm ($\lambda_4$) are generated by using the above-mentioned optical frequency generator (S10). At this time, the generated four different wavelengths are wavelengths in vacuum.

The four different wavelengths should be compensated with wavelength in the air (S20).

In case that the four different wavelengths are not compensated with the wavelengths in the air, the initial estimation value of the distance to be measured is obtained by using the principle of the above-mentioned principle of the frequency sweeping interferometer (S40). At this time, it is assumed that a distance to be measured is obtained by measuring the absolute distance for a fixed optical path of 1.2 m.

After the process of obtaining the initial estimated value, first, excess fraction parts $\epsilon_1$, $\epsilon_2$, $\epsilon_3$, and $\epsilon_4$ for the wavelengths $\lambda_1$, $\lambda_2$, $\lambda_3$, and $\lambda_4$ are measured by analyzing the interference pattern in the wavelengths. At this time, measured excess fraction parts $\epsilon_1$, $\epsilon_2$, $\epsilon_3$, and $\epsilon_4$ are 0.5817, 0.5123, 0.4688, and 0.6578, respectively.

The phase difference $\Delta\phi$ between a first wavelength $\lambda_1$ and a second wavelength $\lambda_2$ is measured by continuously sweeping the frequency from the first wavelength $\lambda_1$ to the second wavelength $\lambda_2$ as shown in FIG. 6. At this time, the integer part $\Delta N$ of the phase difference $\Delta\phi$ can be obtained by counting the number of interference patterns during the wavelength sweeping from the first wavelength $\lambda_1$ to the second wavelength $\lambda_2$. As known from the measured phase of the excess fraction part shown in FIG. 6 the integer part $\Delta N$ is 13.

The excess fraction part $\Delta\epsilon$ can be determined through a difference between the excess fraction parts $\epsilon_1$ and $\epsilon_2$ obtained by analyzing the interference patterns at the first wavelength $\lambda_1$ and the second wavelength $\lambda_2$.

A wavelength $\lambda_S$ of the synthetic wave generated is 184.461 nm from a calculation result through the Equation 6 using the first wavelength $\lambda_1$ and the second wavelength $\lambda_2$. In the end, an initial estimation value L of the absolute distance obtained by using the frequency sweeping interferometer is 1195.206 nm.

Since a range in which the solution of the absolute distance will exist should be confined through the obtained initial estimation value of the absolute distance, the uncertainty of the obtained estimation value is analyzed (S50). The uncertainty of the initial estimation value is equal to or less than 259 μm at the time of measuring a distance of 100 m or less under this condition.

The excess fraction parts for the four different wavelengths are measured by analyzing the interference signal for each wavelength by the above-mentioned multi-wavelength interferometer (S60). Values of the excess fraction parts $\epsilon_1$, $\epsilon_2$, $\epsilon_3$, and $\epsilon_4$ for the wavelengths measured at this time are equal to the values of the excess fraction parts obtained by using the principle of the frequency sweeping interferometer. Integer parts $m_1$, $m_2$, $m_3$, and $m_4$ for the four different wavelengths are determined (S70). At this time, a unique solution of the absolute distance should be within the initial estimation value of the absolute distance ±259 μm when a tolerance of the excess fraction part of each wavelength is equal to or less than 0.013.

The integer parts $m_1$, $m_2$, $m_3$, and $m_4$ for the wavelengths within this range are 3064834, 3064847, 3065830, and 3104637.

When the excess fraction parts $\epsilon_1$, $\epsilon_2$, $\epsilon_3$, and $\epsilon_4$ and the integer parts $m_1$, $m_2$, $m_3$, and $m_4$ for the four different wavelengths $\lambda_1$, $\lambda_2$, $\lambda_3$, and $\lambda_4$ are determined, the absolute distance L for each wavelength is measured through the Equation 3 for measuring the absolute distance in the multi-wavelength interferometer (S80).

The absolute distances L for the four different wavelengths $\lambda_1$, $\lambda_2$, $\lambda_3$, and $\lambda_4$ are shown in Table 1.

TABLE 1

|  | $\lambda_1$ | $\lambda_2$ | $\lambda_3$ | $\lambda_4$ |
| --- | --- | --- | --- | --- |
| Wavelength in vacuum | 780.206961 nm | 780.203668 nm | 779.953524 nm | 770.204349 nm |
| Refractive index of air, n | 1.000263346 | 1.000263345 | 1.000263347 | 1.000263410 |
| Wavelength in air, λ | 780.001551 nm | 779.998260 nm | 779.748180 nm | 770.001523 nm |
| Excess fraction, ε | 0.5817 | 0.5123 | 0.4688 | 0.6578 |
| Standard deviation of ε | 0.0007 | 0.0002 | 0.0011 | 0.0005 |
| Integer value, m | 3064834 | 3064847 | 3065830 | 3104637 |
| Absolute distance, L | 1195.287863 mm | 1195.287863 mm | 1195.287865 mm | 1195.287862 mm |

Initial estimation of L by means of sweeping Wavelength from $\lambda_1$ to $\lambda_2$: 1195.205502 mm
Mean of finally determined by averaging the computed values of L for $\lambda_i$, i = 1, 2, 3, 4: 1195.287863 mm The unique solution of the absolute distance can be obtained by measuring the fixed optical path of 1.2 m through the above-mentioned process and the measurement uncertainty is equal to less than 20 nm.

Since the absolute distance of each wavelength obtained for the fixed optical path of 1.2 m is within the initial estimation value of the absolute distance ±259 μm when the tolerance of the excess fraction part for each wavelength is equal to or less than 0.013, the absolute distance can be measured in a wide area more than several meters by using the principle of the multi-wavelength interferometer.

In the step S20 in which the user determines whether or not the four different wavelengths are compensated with the wavelength in the air, in case that when the wavelengths are compensated with the wavelength in the air, the refractive index of air is determined by measuring environmental variables including temperature, humidity, pressure, concentration of $CO_2$, and the like. The determined refractive index of the air of each wavelength is shown in Table 1.

Each wavelength in the vacuum is divided in the determined refractive index of the air, the wavelengths are compensated with the wavelength in the air. The compensated wavelength in the air is shown in Table 1.

A method of measuring the absolute distances for the four different wavelengths compensated with the wavelength in the air is the same as steps S40 to S80.

As described above, in the present invention, the absolute distance obtained through the frequency sweeping interferometer is used as the initial estimation value of the multi-wavelength interferometer, whereby the absolute distance can be measured through the principle of the multi-wavelength interferometer by using the four different wavelengths without the initial estimation of the measurement distance.

As described above, although the present general inventive concept have been shown and described with reference to above mentioned embodiments and the accompanying drawings, it will be appreciated by those skilled in the art that changes may be made in these embodiments without departing from the principles and spirit of the general inventive concept, the scope of which is defined in the appended claims and their equivalents.

What is claimed is:

1. An absolute distance measurement method using an optical frequency generator, comprising the steps of:
    (a) generating a plurality of different stabilized wavelengths by using the optical frequency generator;
    (b) obtaining an initial estimation value of a distance to be measured by using a frequency sweeping interferometer;
    (c) analyzing measurement uncertainty of the obtained initial estimation value;
    (d) measuring excess fraction parts of the different wavelengths by analyzing interference signals for each of the wavelengths;
    (e) determining integer parts for each of the different wavelengths within the uncertainty range of the initial estimation value; and
    (f) measuring an absolute distance to be measured by using the excess fraction parts and the integer parts for each of the different wavelengths.

2. The absolute distance measurement method using the optical frequency generator as recited in claim 1, wherein the step (a) includes the steps of:
    (a1) generating a beat frequency between a single-wavelength laser generated from an external cavity laser diode (ECLD) and an optical comb of a femtosecond laser;
    (a2) generating an electrical control signal for synchronizing the beat frequency with a predetermined reference frequency from a phase locked loop (PLL) to transmit the generated electrical control signal to the ECLD; and
    (a3) generating stabilized wavelengths according to the electrical control signal transmitted from the PLL in the external cavity laser diode.

3. The absolute distance measurement method using the optical frequency generator as recited in claim 1, wherein the step (a) includes the steps of:
    (a1) extracting a single frequency mode from an optical comb of a femtosecond laser;
    (a2) applying the extracted single frequency mode to a laser diode; and
    (a3) generating a wavelength of a stabilized frequency by amplifying the extracted single frequency mode applied to the laser diode.

4. An absolute distance measurement system using an optical frequency generator, comprising:
    an optical frequency generating module for generating a plurality of different stabilized wavelengths and sweeping frequency continuously from a first wavelength $\lambda_1$ to a second wavelength $\lambda_2$ among a plurality of different wavelengths; and
    an interferometer module for measuring each of excess fraction parts for the different wavelengths emitted from the optical frequency generating module and measuring a phase difference $\Delta\phi$ between two wavelengths by sweeping frequency continuously from the first wavelength $\lambda_1$ to the second wavelength $\lambda_2$,
    wherein the optical frequency generating module includes:
        an external cavity laser diode (ECLD) for generating a single-wavelength laser;
        a femtosecond laser for generating an optical comb;
        an avalanche photo diode for measuring a beat frequency generated between the single-wavelength laser generated from the ECLD and the optical comb of the femtosecond laser; and
        a phase locked loop unit for generating an electrical control signal for synchronizing the beat frequency to a predetermined reference frequency to output the generated electrical control signal to the external cavity laser diode,
    wherein the external cavity laser diode generates a stabilized frequency according to the electrical control signal outputted from the phase locked loop to emit the generated wavelength to the interferometer module.

5. An absolute distance measurement system using an optical frequency generator, comprising:
    an optical frequency generating module for generating a plurality of different stabilized wavelengths and sweeping frequency continuously from a first wavelength $\lambda_1$ to a second wavelength $\lambda_2$ among a plurality of different wavelengths; and
    an interferometer module for measuring each of excess fraction parts for the different wavelengths emitted from the optical frequency generating module and measuring a phase difference $\Delta\phi$ between two wavelengths by sweeping frequency continuously from the first wavelength $\lambda_1$ to the second wavelength $\lambda_2$,
    wherein the optical frequency generating module includes:
        a femtosecond laser for generating an optical comb as a frequency ruler;
        an optical frequency extracting unit for extracting a single frequency mode from the optical comb of the femtosecond laser; and
        an optical frequency amplifying unit for generating a stabilized frequency by amplifying the single frequency mode extracted by the optical frequency extracting unit for the interferometer module.

* * * * *